May 31, 1960     W. F. v. JASKOWSKY ET AL     2,938,292
FINGERPRINTING SYSTEM
Filed Aug. 18, 1955
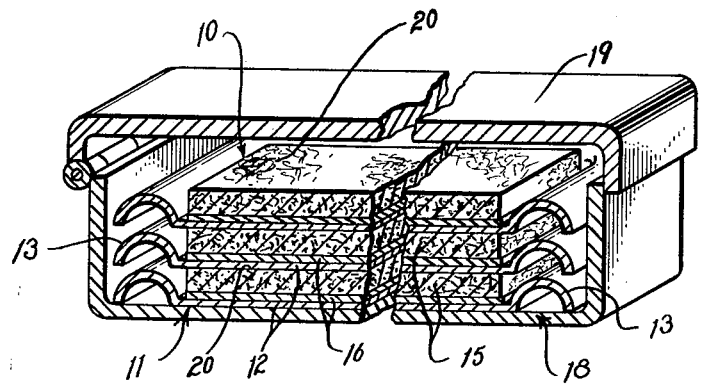
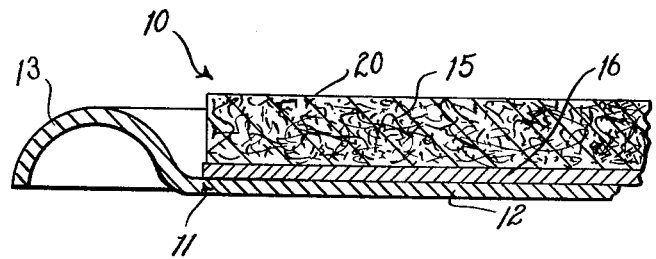
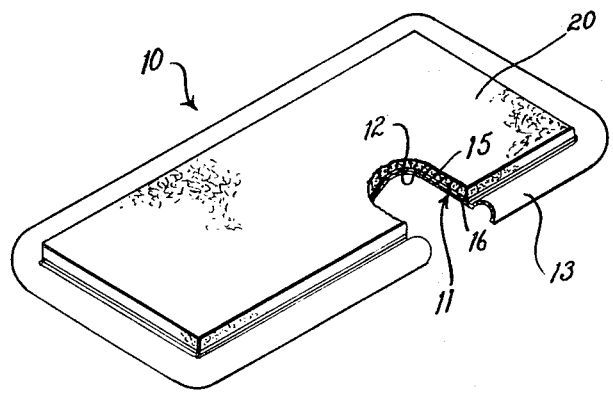
INVENTORS
WOLDEMAR F. v JASKOWSKY
IRVIN R. PFISTER
BY THEIR ATTORNEYS
HARRIS, KIECH, FOSTER, & HARRIS

United States Patent Office 2,938,292
Patented May 31, 1960

2,938,292

FINGERPRINTING SYSTEM

Woldemar F. v. Jaskowsky, Pasadena, and Irvin R. Pfister, Los Angeles, Calif., assignors to Ultra-Violet Products, Inc., San Gabriel, Calif., a corporation of California Filed Aug. 18, 1955, Ser. No. 529,285

13 Claims. (Cl. 41—4)

The present invention relates to fingerprinting equipment and, more particularly, to an improved applicator for fingerprint inks, particularly those inks which are substantially invisible but which become visible when viewed under ultraviolet light. The invention relates also to a new fluorescent ink composition useful in such applicator or in the marking of various products by more or less invisible markings for purpose of identification. The invention will be particularly exemplified as applied to the problem of fingerprinting.

Fingerprint identification of individuals is becoming more commonplace but has the distinct disadvantage that present types of inks apply a dark coating to the finger tips which clings after the printing operation and which is very difficult to remove. Previously-known inks and applicators also create a bad psychological impression on the person to be identified.

Many stores, for example, would like to reduce losses from bad checks by requiring that there be applied to the check a fingerprint of the person endorsing or making it. When employing previously-available equipment, this practice is so inconvenient and objectionable to customers that it is not widely used. With the present invention, fingerprinting becomes substantially unobjectionable to the customer, both from a physical and psychological standpoint. It is an object of the present invention to provide fingerprinting inks and equipment which apply to the pad of the finger a superficial, substantially invisible coating which can be transferred to a check or to paper to produce a fingerprint substantially invisible in ordinary light but which becomes visible when subjected to ultraviolet radiation. A further object is to provide a novel means for applying invisible or fluorescent ink to any object for purpose of identification.

Ink pads previously employed for holding fingerprint inks have been covered with fabrics which impart a definite texture or pattern from the covering fabric to the contacting article, e.g., the pads of the fingers. This texture or pattern detracts from and in many instances destroys the identifying nature of the later-made fingerprint because the texture or pattern is superimposed on the line structure produced by the skin. Attempts to disposed fingerprint inks within uncovered pads made, for example, of sponge rubber have not been satisfactory. Such materials deteriorate in the presence of chemical ingredients used in fingerprint inks. Also, they do not transfer a texture-free or pattern-free layer of ink.

It is an object of the present invention to provide an improved applicator having an ink-applying surface which is substantially free of texture and pattern. Another object is to provide a substantially non-textured and non-patterned applicator which is comparatively cheap to manufacture and which is capable of use with a variety of inks, although especially successful with the ink compositions hereinafter identified.

A further object of the invention is to provide a base element for such an applicator pad; also to store fingerprint inks in a series of stacked pads separated by ink-impervious members such as the aforesaid trays. In this way, finger pressure applied to the exposed surface of the uppermost pad will not only transfer a superficial coating of the ink to the finger but will also apply pressure to pads lower in the stack to keep them in good condition for later use.

A further object of the invention is to provide a relatively shallow pad which can be economically destroyed after a few uses, before its applying surface becomes discolored, in favor of a similar pad which may be positioned therebeneath.

It is also an object of the invention to provide novel fingerprint inks which are substantially invisible under ordinary light but which become distinctly visible under ultraviolet light. A further object is to provide inks of the class described which can be used under a wide variety of temperature and atmospheric conditions; which leave no objectionable residue on the fingers of an individual; which do not deteriorate with age; and which can be transferred to a variety of surfaces if the latter are brought into contact with a member containing the ink.

A further object is to provide a novel method of making an applicator or pad for applying to a contacting object a superficial layer of invisible ink.

Further objects and advantages of the invention will be apparent from the examples hereinafter presented and from the accompanying drawing in which:

Fig. 1 is a sectional perspective view of a container with a stack of applicator units of the invention therein;

Fig. 2 is an enlarged sectional view of a fragment of one of the applicator units; and Fig. 3 is a perspective view, partially broken away, showing one of the applicator units.

Referring particularly to the drawing, each applicator unit 10 preferably includes a base element 11 having a flat bottom 12 reinforced by a curved or upturned edge 13. Each base element 11 supports its own applicator or pad 15, formed as later described. The pad 15 may rest directly on the tray-like member 11 but it is preferable to apply the material of the pad to a thin layer of foil or paper forming a backing sheet 16 which acts as a base for the pad material and which can later be adhered to the flat surface 12 of the base element.

The applicator units 10 can be stacked within a container 18 which may conveniently have a hinged top 19 keeping dust and contaminants from the uppermost applicating surface 20 of the top pad. When thus stacked, the flat portion 12 of each base element 11 engages the applicating surface 20 of the pad 15 immediately therebeneath. In this way, the base elements separate the pads and effectively contact and cover the applying surfaces 20 to prevent any contact with the air until the particular pad is to be used. The base elements 11 are preferably formed of thin aluminum or aluminum foil. They protrude sidewardly beyond the stack and serve as a convenient way of lifting the uppermost pad to expose the one therebelow. In some instances, however, the pads 15 and their backing sheets 16 can be directly stacked without the use of intervening base elements.

Each applicator or pad 15 is only a small fraction of an inch in thickness, typically ¼" or less. It is preferably made of a material presenting an applying surface which is substantially free of pattern or texture. The fluorescent ink pervades the applicator or pad 15 and is present at the applying surface 20 to be transferred as a minute film to the crests of any intaglio surface, such as the upstanding ridges of the human finger.

The applicator or pad 15 is preferably formed of a mass of pulp, typically cellulose fibers, held together by a binder and containing a suitable fluorescent ink. In the preferred practice of the invention, the applicator or pad is made by combining separately-formulated pulp and ink phases, as will be described. One of these phases contains materials of the water-soluble type and the other contains materials of the oil type. In the preferred practice, the pad phase is composed of materials compatible with water and the ink phase contains materials not compatible with water, e.g., resins and/or oils.

The preferred embodiment involves the use of a substantially non-drying ink phase containing resin, a plasticizer having certain specific properties as hereinafter described, at least one fluorescent material such as fluorescent pigments or dyes, and, if desired, various minor ingredients such as surface-active agents, scenting agents, etc. Such an ink pervades an applicator or pad 15 of the class described, which comprises the backing sheet 16 and the mass of individual fibers which are secured together by a suitable binder, typically a cellulose derivative which does not destroy the resiliency of the pulp.

Considering first the preferred ink phase, this is composed of a natural or synthetic resin, about 8–72%; a plasticizer, about 72–8%; and a fluorescent material, about 15–30%. It may include a fraction of 1% of surface-active agents and/or a fraction of 1% of a scenting agent.

The plasticizer may be any of a large number of compounds known in the plastics industry as plasticizers or softeners. Particularly suitable for use with the invention are the common plasticizers employed for vinyl compositions, such as, for example, dibutylphthalate and tricresyl phosphate. In general, any plasticizers falling within the phosphate or phthalate classifications are desirable for use with the invention. A large list of plasticizers which may be used with the invention is provided in the text "Encyclopedia of Chemical Technology," volume 10, published by The Interscience Encyclopedia, Inc., New York, copyright 1953, under the heading of "Plasticizers," pages 768–770 inclusive.

One of the prime functions of the plasticizer is to act in conjunction with the resin as a carrier for the other materials incorporated in the inks of the invention. The preferred plasticizers are of the slow-drying or substantially non-drying types facilitating absorption of the ink into a porous surface, such as the paper receiving the ink print from the finger. A slow-vaporizing or substantially non-volatile plasticizer is preferred. For practical purposes, the plasticizer should be substantially non-volatile under the normal conditions of temperature to be expected, typically about 0° F. to about 110° F. Further, the preferred plasticizers are of substantially constant viscosity throughout this entire range and produce with the resin sufficient surface tension to adhere to a limited extent to the fingers of an individual without actually becoming tacky. This latter property is quite important and is best determined by the simple test of determining whether the plasticizer-resin material sticks to a finger. The plasticizer should also be substantially inert under ordinary conditions but should be compatible with the dyestuffs and other organic compounds normally incorporated in the present inks. It is often desirable to use two or more separate plasticizers in formulating the ink.

The resin in the preferred ink may be any material or synthetic resin compatible with the plasticizer. It tends to control the adhesiveness of the ink to the paper or other porous surface to which it is applied. As previously mentioned, the ink may contain about 8–72% by weight of the resin. If the resin is quite solid, percentages in the lower portion of this range are preferred, e.g., in the neighborhood of 10%. If the resin is quite liquid, proportions in the upper part of such range are preferred, e.g., about 50–72%. The resin desirably has a disinfecting function as concerns the fingerprint ink, thereby preventing person-to-person transfer of germs, bacteria, fungi or disorders transmittable by indirect contact. Typical resins are chlorinated phenolic materials including chlorinated biphenols, and chlorinated polyphenols. These resins may also be of the aryl (sulfonamide) formaldehyde condensation type such as "Santolite MHP," manufactured by Monsanto Chemical Co., of St. Louis, Missouri, and which is an aryl sulfonamide-formaldehyde resin with a softening point of approximately 62° C., brittle at ordinary temperatures, nearly colorless, insoluble in drying oils but soluble in many organic solvents, and which is compatible with nitrocellulose and most plasticizers.

The ink should also contain at least one material which is substantially invisible in ordinary light but which becomes visible when viewed in ultraviolet light, such material being hereinafter termed a fluorescent material. A mixture of dyes and pigments totalling about 20% by weight with pigments predominating, often in the ratio of about 4:1, is preferred. However, the fluorescent material may be composed entirely of pigments or entirely of dyes if desired. If the fluorescent material is composed enitrely of dyes, the percentage may be as low as ¼% by weight of the ink. The dye component, if any, of the fluorescent materials should be soluble in the plasticizer or plasticizer-modified resin of the ink.

There are a large number of fluorescent dyestuffs useful in the preferred ink, manufactured both in this country and abroad. Some suitable dyes are "Fluorol OB" (a derivative of 4-aminonaphthalimide) or "Fluorol OBR" made by General Dyestuffs Corp. of New York City; "Calcofluor White RW" made by American Cyanamid Co.; "Florosol WSC" made by National Aniline Division of Allied Chemical and Dye Co.; etc.

As to pigments, various phosphors of the broad type commonly used in making cathode ray tubes can be employed, typically phosphors which are finely ground so as to pass at least a 200-mesh screen. Such inorganic materials are not capable of being dissolved in the ink but are present as a suspended phase within the resinous phase. However, the suspension can be quite permanent, particularly by use of suitable surface-active agents. The use of inorganic pigments is particularly advantageous because they remain in ink coatings even under conditions where the organic fluorescent dyestuffs may be destroyed or chemically modified, as when subjected to heat or various adverse atmospheric conditions.

The preferred ink compositions may also contain minute amounts of secondary ingredients. For example, it is normally desirable to incorporate a surface-active agent in an amount no more than a fraction of 1%, which serves to aid in the formulation of a smooth composition and which acts as a suspension agent for any pigments present. Esters of sodium sulfosuccinic acid are merely examples of one class of surface-active agents well known in the art and which can be advantageously employed. Another secondary ingredient may be a fraction of 1% of a scenting ingredient, typically perfumes of which pine oil is a commercial example.

The inks of the instant invention may be blended using any conventional equipment, such as various kneading or milling machines employed in the rubber industry, with a minimum of difficulty at room temperature without loss of the various ingredients employed. If desired, various solvents, such as methyl-Cellosolve or the like, may be incorporated into these inks during the blending procedure so as to aid in the formulation. Such solvents can be removed from the compositions produced before use by heating in a vacuum, or, for certain limited applications, can be allowed to remain in these compositions until they are applied to a sheet of paper.

Purely by way of example, the following ink formulation will be found quite satisfactory and will suggest other compositions within the scope of the invention:

Ink formula

| Material | Grams | Approximate Percentages by Weight |
|---|---|---|
| "Santolite MHP" (resin) | 500 | 40% |
| Dibutylphthalate (plasticizer) | 311 | 25% |
| Tricresyl phosphate (plasticizer) | 189 | 15% |
| Sodium succinate (anionic surface-active agent) | 2.2 | Less than 1% |
| Fluorescent dye | 10 | 4% |
| Phosphor (pigment) | 240 | 16% |
| Pine Oil (perfume) | ¼ | Less than 1% |

Concerning the pulp phase, which determines the physical mass of the applicator or pad 15, this is composed largely of fibers in the completed product. Pulp fibers are preferred, typically fibers of wood pulp, although other natural or synthetic fibers insoluble in the ink phase can be employed. In this connection, cellulose fibers can be used, as can also fibers of cotton, wool, silk, etc., or synthetic fibers of nylon, polyethylene, etc. In the preferred practice of the invention we use highly beaten cellulose pulp such as conventionally employed in the manufacture of filter paper.

The individual fibers are held together by a binder. This binder may be a resinous material but is preferably a cellulose derivative, preferably water soluble, typically methyl cellulose. The pulp phase is initially compounded with a major percentage of water, later removed. The pulp and binder are intimately mixed with the water, forming a mixture of the consistency of thick cream.

The pulp phase may include a small amount, usually less than 1%, of a surface-active agent, typically a wetting agent or a suspending agent, such as 2-ethyl hexyl sodium sulfo succinate or its homologs, or alkylnaphthalene sodium sulfonates. It may also incorporate antifoaming agents, dyes, etc., in total amount not greater than about 2%. For example, soluble dyestuffs up to about 2% can be employed to color the resulting pad. It is preferred that the dyestuffs be soluble in water and substantially insoluble in the plasticizer or plasticizer-resin composition of the ink phase, thereby preventing discoloration of the ink applied, for example, to the finger tips.

The following are examples of the pulp phase, useful with the fingerprint or fluorescent inks herein specifically described and also with other fluorescent inks:

Pad formula

| Material | Grams | Percentages By Weight |
|---|---|---|
| Cellulose Pulp | 100 | 8 |
| Methyl Cellulose as a binder | 30 | 2 |
| Water | 1,000 | 90 |
| Anti-foaming Agent ("Antifoam A", a dimethyl polysiloxane defoamer made by Dow Corning Corp.) | | 0.1 |

In one alternative, the pulp phase materials may be mixed together at room temperature, placed on a long strip of the backing seet material, such as a strip of paper or a sheet of aluminum foil, being dried at a temperature of about 100° F. to remove the water and permit the binder to bond the fibers. The ingredients can be extruded or spread on such a backing sheet. The resulting dried sheets may be impregnated with suitable ink formulations, typically the ink phase previously exemplified, by the use of vacuum impregnating techniques.

However, it is normally preferred to admix the pulp-phase with the ink phase before extruding or spreading same on such a backing sheet, the layer being then dried at slightly elevated temperatures to remove the water and to cause the binder to bond the fibers. Care must be taken that the temperature is not sufficiently high to cause any damage to the dyestuffs or any loss of the plasticizer by evaporation. The resulting strip can be cut to length, forming the pads 15 which may then respectively be adhered to the tray-like members 11.

Ratios of pulp phase to ink phase are preferably in the neighborhood of 1:1 but may vary from about 3:1 to about 1:3. A particularly desirable fingerprint pad can be made by mixing one part of the above pulp phase formula with two parts by weight of the above ink phase formula, applying the resulting mixture as a coating of about ⅟₁₆ inch to the backing sheet and then drying the coating at about 100° F.

Considering the ink phase and dried pulp-phase mixture, this may desirably be composed, in percentage by weight, of 90% ink phase and 10% dry pulp phase or within the range 97% ink phase and 3% dry pulp phase to 75% ink phase and 25% dry pulp phase. More specifically, the composition by weight of such mixture may be as follows:

| | General Example | Specific Example "A" | Specific Example "B" |
|---|---|---|---|
| Ink phase: | Percent | Percent | Percent |
| Resin | 30-38 | | 30-38 |
| "Santolite MHP" | | 30-38 | |
| Plasticizer | 29-38 | | 30-38 |
| dibutylphthalate | | 18-24 | |
| tricresyl phosphate | | 11-14 | |
| Fluorescent material | .2-20.1 | | .2-21.5 |
| Dye | | 1.3-2.1 | |
| Pigment | | 14-18 | |
| Pad phase: | | | |
| Cellulose pulp | 18-2 | 18-2 | 18-2 |
| Binder (methyl cellulose) | 4.8-0.6 | 4.8-0.6 | 7-.5 |
| Miscellaneous: | | | |
| Surface active agent (total for ink phase and pad phase) or such agent plus antifoaming and perfuming agents | 2.9-1.3 | 2.9-1.3 | |

If the fluorescent material is a dye-pigment mixture or pigment alone, the percentage of the fluorescent component will usually be about 15–20%, but if such component is dye alone, the percentage may be as low as .2%.

The ink-impregnated pad formed by the process hereinbefore described will be found to be entirely stable and to have the aforesaid desirable properties of presenting a substantially non-textured and non-patterned ink-applying surface. Furthermore, the pad has inherent resiliency. When the fingers are pressed thereagainst, this resiliency serves to distribute the residual ink to all portions of the finger in contact with the pad; also to work the pad material to insure uniform distribution of the remaining ink therein. The resiliency of the pad insures that a satisfactory amount of ink is at all times applied to the fingers.

It will be recognized that the pulp phase and the ink phase heretofore exemplified are incompatible in the sense that the ink phase is substantially water insoluble while the pulp phase has a water base. It is within the contemplation of the invention to use, as an alternative, an ink phase which is of the water-soluble type and a pulp phase which has a base of organic solvent and which is thus water insoluble.

Considering such an alternative ink phase of the water-soluble type, this may be composed of a liquid phase material, a thickening agent, and a fluorescent material, with permissive minor amounts of other materials such as surface-active agents, perfume, etc.

The thickening agent substitutes for the resin in the ink phase previously described and preferably consists of about 5–70% by weight of a gum, cellulose derivative or other similar water-soluble material, typically methyl cellulose, polyvinyl alcohols, sodium carboxymethycellulose, dextrin, starch, gelatin, casein, etc.

The liquid phase material corresponds to the plasticizer in the ink phase previously described and is present in amount about 95–30% by weight. It may be glycerin or a glycol such as ethylene glycol or propylene glycol. In addition, up to about ⅓ of the liquid phase material may be one or more of the lower alcohols such as ethyl or propyl alcohol. A small fraction of the liquid phase material is also water, typically 2–30%.

As to the fluorescent material, one or more of the aforesaid pigments and/or dyes may be employed, usually in amount about 1–30%.

Small amounts of surface-active agents may be desirable, typically suspending agents. The amount thereof is usually less than 1%. In addition, scenting agents may be employed in amount up to about 1%. Fine oil is an example.

A typical example of the alternative water-soluble ink in percentage by weight is as follows:

| | Percent |
|---|---|
| Dextrin | 34 |
| Glycol | 44 |
| Water | 6 |
| Pigments and dyes | 15 |
| Surface-active and scenting agents | 1 |

With such an alternative water-soluble ink phase, the alternative pulp phase should be water insoluble. It may include about 2–20% by weight of cellulose fibers, about 0.5–10% of a binder and about 95–70% of an organic solvent.

The cellulose fibers may be any of those hereinbefore mentioned. The binder may be any of the resins heretofore mentioned of which chlorinated phenols are examples, such as "Aroclor 1268" made by Monsanto Chemical Co., a chlorinated biphenol, approximately 68% chlorinated, having the properties: density—1.810; wt./gal.—15.09 lbs.; coefficient of expansion—0.00067 (20°–100° C.); distillation range—435°–450° C.; softening point—135°–160° C. Alternatively the binder may be a cellulose derivative, often added with sufficient solvent to dissolve the cellulose product. Sometimes it is desirable to use both a resin and such cellulose derivative as the binder. The solvent may be any organic solvent such as carbon tetrachloride, methyl ethyl ketone, etc., or a combination of organic solvents.

A typical formulation for such a solvent-type pulp phase in percentage by weight is as follows:

| | Percent |
|---|---|
| Cellulose fibers | 7 |
| Ethyl cellulose (binder) | 7 |
| Chlorinated phenol (binder) | 7 |
| Carbon tetrachloride (solvent) | 33 |
| Methyl ethyl ketone (solvent) | 46 |

As before, the pulp phase can be spread or extruded on the backing sheet and the solvent evaporated before impregnating the resulting pad with the ink phase. Preferably, however, the alternative ink phase and pulp phase are initially intermixed before being spread or extruded on the backing sheet and before evaporation of the solvent, often under slightly elevated temperatures. Ratios of pulp phase to ink phase are usually between 1:1 and 1:9, preferably in the neighborhood of 1:3. The resulting ink-containing pad will have the following approximate composition by weight after the solvent has been evaporated:

| | General Example | Specific Example |
|---|---|---|
| | Percent | Percent |
| Ink phase: | | |
| Thickener (dextrin) | 28–33 | 32 |
| Glycol | 37–43 | 41 |
| Water | 5–6 | 5.5 |
| Fluorescent material (dyes and/or pigments) | .2–15 | 14 |
| Surface-active and scenting agents | .8–1 | 1 |
| Pulp phase: | | |
| Cellulose Fibers | 5.6–.7 | 2.2 |
| Binder (ethyl cellulose) | 5.5–6 | 2.1 |
| Binder ("Aroclor 1268") | 5.6–.7 | 2.2 |

Various changes and modifications will be apparent to those skilled in the art from the hereincontained description of exemplary embodiments of the invention. Such changes and modifications can be made without departing from the spirit of the invention as defined in the appended claims.

We claim as our invention:

1. Fingerprinting apparatus comprising: a plurality of stacked applicator units each comprising an ink impervious base element having flat upper and lower surfaces, each base having attached exclusively to the upper surface thereof a fibrous pad pervaded by an ink composition with an upwardly-facing substantially non-patterned applying surface contacted by the flat lower surface of the base element immediately thereabove, each pad having four edges, each base element extending outwardly from each of the four edges of the corresponding pad, the base elements thus protruding sidewardly from the stack beyond the pads to be grasped in succession for removal of the topmost applicator unit after use thereof.

2. Fingerprinting apparatus as defined in claim 1 in which each base element is a base element with curved reinforcing edges.

3. A substantially non-patterned fingerprint pad for transferring to a finger tip a superficial coating of ink free of pattern from the applying surface, said pad including: a mass of fibers held together in sheet form by a binder comprising a fluidizing agent and at least one material taken from the class consisting of cellulose derivatives, natural resins and synthetic resins, said sheet providing an applying surface substantially free of pattern; and a fluorescent fingerprint ink pervading said mass of pulp fibers to be available at said applying surface to transfer such a superficial coating of said ink free of texture to the finger tip when pressed against said applying surface, said fingerprint ink comprising a fluorescent material substantially invisible in ordinary light but excitable by ultraviolet radiation to become visible, said fluorescent material being at least one material selected from the class consisting of pigments and dyes.

4. A substantially non-patterned fingerprint pad for transferring to the finger tip a superficial coating of fluorescent material substantially free of pattern from the applying surface, said pad including: a resilient mass of pulp held together by a binder, and containing a resin, a substantially non-drying plasticizer compatible with the resin, and at least one fluorescent material selected from the class consisting of fluorescent dyes and pigments.

5. A substantially non-patterned applicator for fingerprint ink for transferring to the finger tip a superficial coating of fluorescent ink free from pattern from the applying surface, said applicator including: a backing sheet, and a pad of thickness only a fraction of an inch secured to said backing sheet, a pad presenting a substantially non-patterned applying surface for engagement by the fingertip, the composition of said pad, in percentage by weight, being substantially as follows:

| | Percent |
|---|---|
| Cellulose fibers | about 18–2 |
| Cellulose derivative | about 7–.5 |
| Resin | about 30–38 |
| Plasticizer | about 30–38 |
| Fluorescent material | about .2–21.5 | said resin being a material selected from the class consisting of natural and synthetic resins compatible with said plasticizer, said plasticizer being of the slow-vaporizing type, said fluorescent material being at least one material selected from the class consisting of fluorescent pigments and dyes.

6. A substantially non-patterned applicator for fingerprint ink for transferring to the finger tip a superficial coating of fluorescent ink free from pattern from the applying surface, said applicator including: a backing sheet, and a pad of thickness only a fraction of an inch secured to said backing sheet, a pad presenting a substantially non-patterned applying surface for engagement by the finger tip, the composition of said pad, in percentage by weight, being substantially as follows:

|  | Percent |
|---|---|
| Cellulose fibers | about 18–2 |
| Cellulose derivative | about 4.8–.6 |
| Resin | about 30–38 |
| Plasticizer | about 29–38 |
| Fluorescent material | about .2–20.1 |
| Remaining component | about 2.9–1.3 | said resin being a material selected from the class consisting of natural and synthetic resins compatible with said plasticizer, said plasticizer being of the slow-vaporizing type, said fluorescent material being at least one material selected from the class consisting of fluorescent pigments and dyes, said remaining component being at least one material selected from the class consisting of surface-active agents, antifoaming agents and perfuming agents, said remaining component including at least one surface-active agent.

7. A substantially non-patterned applicator for transferring to the finger tip a superficial coating of fluorescent fingerprint ink free of pattern from the applying surface, said applicator including: a backing sheet, and a pad of thickness only a fraction of an inch secured to said backing sheet, the pad presenting a substantially non-patterned applying surface for engagement by the finger tip, the composition of said pad being substantially as follows:

|  | Percent |
|---|---|
| Cellulose fibers | about 5.6–.7 |
| Binder | about 11.1–1.3 |
| Thickening agent | about 28–33 |
| Glycol | about 37–43 |
| Water | about 5–6 |
| Fluorescent material | about .2–15 |
| Surface-active agent | about .8–1 |

8. A substantially non-patterned applicator for invisible fluorescent inks which comprises: a substantially non-textured mass of cellulose fibers held as a resilient mass by a water-soluble binder and presenting a substantially non-patterned applying surface; and a fluorescent ink composition pervading said mass, said ink composition comprising a water-insoluble plasticizer and a resin compatible with the plasticizer, said ink composition containing a fluorescent material selected from the class consisting of fluorescent pigments and dyes.

9. A method of making substantially non-patterned pads for transferring to contacting objects a superficial layer of fluorescent material, which method includes the steps of: separately formulating a pulp phase and an ink phase relatively insoluble in each other, said pulp phase comprising cellulose fibers, a binder and a fluidizing agent, said ink phase comprising a base insoluble in said fluidizing agent and at least one fluorescent material; mixing said pulp and ink phases; forming the resulting mixture into a layer the desired thickness of each said pad; and drying said layer.

10. A method as defined in claim 9 involving the use of a backing member, and including the step of applying said layer of said mixture to said backing member to form said pad.

11. A method of making substantially non-patterned pads for transferring to contacting objects a superficial layer of fluorescent material, which method includes the steps of: separately formulating a pulp phase and an ink phase relatively insoluble in each other, said pulp phase comprising a mass of fibers, water, and a water-soluble binder, said ink phase comprising a water-insoluble resinous base, a plasticizer, and a fluorescent material; mixing together said ink and pulp phases; forming the resultant mixture into a layer of the desired thickness; and removing the water therefrom.

12. A method of making substantially non-patterned pads for transferring to contacting objects a superficial layer of fluorescent material, which method includes the steps of: separately formulating a pulp phase and an ink phase, said pulp phase comprising a mass of fibers, water, and a water-soluble binder selected from the class consisting of cellulose derivatives, natural resins, and synthetic resins, said ink phase comprising a water-insoluble resinous base, a slow evaporating plasticizer, and a fluorescent material selected from the class consisting of pigments and dyes; mixing together said ink and pulp phases; forming the resultant mixture into a layer of the desired thickness; and heating said layer to remove the water therefrom and to cause the binder to bind together the fibers.

13. A method of making substantially non-patterned pads for transferring to contacting objects a superficial layer of fluorescent material, which method includes the steps of: separately formulating a pulp phase and an ink phase, said pulp phase comprising a mass of fibers, water, and a water-soluble binder selected from the class consisting of cellulose derivatives, natural resins, and synthetic resins, said ink phase comprising a water-insoluble resinous base, a slow evaporating plasticizer, and a fluorescent material selected from the class consisting of pigments and dyes; mixing together said ink and pulp phases; applying the resultant material in a layer of the desired thickness to a relatively thin backing member; and heating said layer to remove the water therefrom and to cause the binder to bind together the fibers.

References Cited in the file of this patent

UNITED STATES PATENTS

| 669,074 | Carl | Mar. 5, 1901 |
| 812,553 | Dubey | Feb. 13, 1906 |
| 1,044,702 | Steiger | Nov. 19, 1912 |
| 1,559,294 | Spery | Oct. 27, 1925 |
| 2,056,809 | Smith | Oct. 6, 1936 |
| 2,171,427 | Eggert et al. | Aug. 29, 1939 |
| 2,249,888 | Dodge | July 22, 1941 |
| 2,267,758 | Sell | Dec. 30, 1941 |
| 2,298,760 | Gilbert | Oct. 13, 1942 |
| 2,333,329 | Miglarese | Nov. 2, 1943 |
| 2,353,420 | Sowash | July 11, 1944 |
| 2,384,018 | Doepner | Sept. 4, 1945 |
| 2,503,790 | Tule | Apr. 11, 1950 |
| 2,524,733 | Payne et al. | Oct. 3, 1950 |
| 2,639,990 | Kendall et al. | May 26, 1953 |

UNITED STATES PATENT OFFICE

CERTIFICATE OF CORRECTION

Patent No. 2,938,292                               May 31, 1960

Woldemar F. v. Jaskowsky et al.

It is hereby certified that error appears in the printed specification of the above numbered patent requiring correction and that the said Letters Patent should read as corrected below.

Column 1, line 56, for "disposed" read -- dispose --; column 3, line 5, for "oil" read -- oily --; column 5, line 63, for "seet" read -- sheet --; column 7, line 12, for "Fine" read -- Pine --.

Signed and sealed this 29th day of November 1960.

(SEAL)
Attest:

KARL H. AXLINE
Attesting Officer

ROBERT C. WATSON
Commissioner of Patents